US012606022B2

(12) United States Patent
Hirota

(10) Patent No.: US 12,606,022 B2
(45) Date of Patent: Apr. 21, 2026

(54) VEHICLE DISPLAY CONTROL DEVICE, VEHICLE DISPLAY CONTROL METHOD, RECORDING MEDIUM RECORDED WITH VEHICLE DISPLAY CONTROL PROGRAM, AND VEHICLE

(71) Applicant: TOYOTA JIDOSHA KABUSHIKI KAISHA, Toyota (JP)

(72) Inventor: Takahiro Hirota, Nukata-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 287 days.

(21) Appl. No.: 18/330,516

(22) Filed: Jun. 7, 2023

(65) Prior Publication Data

US 2023/0415573 A1 Dec. 28, 2023

(30) Foreign Application Priority Data

Jun. 27, 2022 (JP) ................................. 2022-102959

(51) Int. Cl.
| | |
|---|---|
| *B60K 35/28* | (2024.01) |
| *B60K 35/23* | (2024.01) |
| *B60K 35/81* | (2024.01) |
| *B60K 35/65* | (2024.01) |

(52) U.S. Cl.
CPC .............. *B60K 35/28* (2024.01); *B60K 35/23* (2024.01); *B60K 35/81* (2024.01); *B60K 35/654* (2024.01); *B60K 2360/179* (2024.01)

(58) Field of Classification Search
None
See application file for complete search history.

(56) References Cited

U.S. PATENT DOCUMENTS

| | | | | |
|---|---|---|---|---|
| 9,697,734 | B2 * | 7/2017 | Hatakeyama | ............ G08G 1/16 |
| 2016/0379497 | A1 * | 12/2016 | Hatakeyama | ............. B60R 1/24 |
| | | | | 340/435 |
| 2018/0178722 | A1 * | 6/2018 | Ohta | ....................... G01S 13/08 |

FOREIGN PATENT DOCUMENTS

| | | | | | |
|---|---|---|---|---|---|
| DE | 102017131125 | A1 * | 6/2018 | .......... | G01S 13/867 |
| JP | 2018103704 | A * | 7/2018 | .......... | B62D 15/025 |
| JP | 6551384 | B2 * | 7/2019 | .......... | G01S 13/867 |
| JP | 2019139368 | A * | 8/2019 | | |
| JP | 2020-001589 | A | 1/2020 | | |
| JP | 2021060808 | A * | 4/2021 | | |
| KR | 20180000965 | A * | 1/2018 | .......... | B60W 50/14 |
| WO | WO-2015098136 | A1 * | 7/2015 | .......... | G08G 1/166 |
| WO | WO-2019155557 | A1 * | 8/2019 | .......... | G08G 1/0962 |
| WO | WO-2022024962 | A1 * | 2/2022 | .......... | B60K 35/81 |

* cited by examiner

*Primary Examiner* — Shelley Chen
(74) *Attorney, Agent, or Firm* — Oblon, McClelland, Maier & Neustadt, L.L.P.

(57) ABSTRACT

A vehicle display control device acquires position information of a detection object ahead of a vehicle. The vehicle display control device generates an image indicating a direction from the vehicle toward the detection object based on the acquired position information of the detection object. When the generated image is displayed on a display area in front of a driver's seat of the vehicle, the vehicle display control device causes display of the image overlaid on a forward scene of the vehicle while limiting display of the image in a specific region inside the display area.

9 Claims, 6 Drawing Sheets

VEHICLE DISPLAY CONTROL DEVICE, VEHICLE DISPLAY CONTROL METHOD, RECORDING MEDIUM RECORDED WITH VEHICLE DISPLAY CONTROL PROGRAM, AND VEHICLE

CROSS-REFERENCE. TO RELATED APPLICATION

This application is based on and claims priority under 35 USC 119 from Japanese Patent Application No. 2022-102959 filed on Jun. 27, 2022, the disclosure of which is incorporated by reference herein.

BACKGROUND

Technical Field

The present disclosure relates to a vehicle display control device, a vehicle display control method, a recording medium recorded with a vehicle display control program, and a vehicle.

Related Art

A vehicle display control device disclosed in Japanese Patent Application Laid-Open (JP-A) No. 2020-001589 suppresses the intended content of respective images from becoming difficult to convey to a driver when displaying virtual images overlaid on a forward scene of a vehicle by projecting the images onto a projection member (see, for example, FIG. 6).

However, in cases in which various information is displayed on a display area in front of a driver's seat of a vehicle, were such display to become a distraction to driving by the driver then this would be undesirable. There is accordingly demand, when displaying various information on a display area in front of a driver's seat of a vehicle, to display the various information in the display area in front of the driver's seat of the vehicle while suppressing this from becoming a distraction to the driving of the driver.

In the vehicle display control device of JP-A No. 2020-001589, plural group images classified into plural groups including a dynamic target group, a static target group, and a road surface group are depicted on a single display while split into group-specific layers. Although an object of the vehicle display control device of JP-A No. 2020-001589 is to suppress the intended content of respective images from becoming difficult to convey to the driver, there is no consideration related to the display of such plural images becoming a distraction to the driving of the driver.

In consideration of the above circumstances, an object of the present disclosure is to provide a vehicle display control device, vehicle display control method, vehicle display control program, and vehicle that are capable of displaying images on a display area in front of a driver's seat of a vehicle while suppressing this from becoming a distraction to the driving of the vehicle driver.

SUMMARY

A vehicle display control device of a first aspect includes an acquisition section that acquires position information of a detection object ahead of a vehicle, a generation section that generates an image indicating a direction from the vehicle toward the detection object based on the position information of the detection object as acquired by the acquisition section, and a display control system that, when the generated image generated by the generation section is displayed on a display area in front of a driver's seat of the vehicle, cause displays of the image overlaid on a forward scene of the vehicle while limiting display of the image in a specific region inside the display area.

The vehicle display control device acquires the position information of the detection object ahead of the vehicle. The vehicle display control device generates the image indicating the direction from the vehicle toward the detection object based on the acquired position information of the detection object. When the generated image is displayed on the display area in front of the driver's seat of the vehicle, the vehicle display control device causes display of the image overlaid on the forward scene of the vehicle while limiting display of the image in the specific region inside the display area. This thereby enables the image to be displayed on the display area in front of the driver's seat of the vehicle while suppressing this from becoming a distraction to the driving of the vehicle driver. Moreover, vehicle surrounding information can be notified to the driver while suppressing this from becoming a distraction to the driving of the vehicle driver. Limiting the display of the image in the specific region enables a delay for the driver in noticing an obstruction ahead of the vehicle to be suppressed from occurring. Limiting the display of the image in the specific region where it is liable to become a distraction to the driving of the driver enables display of the image to be suppressed from becoming a distraction to the driving of the driver.

A vehicle display control device of a second aspect is the vehicle display control device of the first aspect, wherein, in a case in which an entropy of information displayed in the specific region would be a specific entropy or greater, the display control section limits display of the image in the specific region such that the entropy of information displayed in the specific region becomes less than the specific entropy. The entropy of information displayed inside the specific region is thereby reduced, enabling display of the image to be suppressed from becoming a distraction to driving of the driver.

A vehicle display control device of a third aspect is the vehicle display control device of the first aspect or the second aspect, wherein the specific region is a region of a reference height or higher inside the display area as seen by a vehicle driver. Limiting display of the image where it is liable to become a distraction to driving of the driver in an upper region of the reference height or higher as seen by the driver in this manner enables the display of the image to be suppressed from becoming a distraction to driving of the driver. More specifically, limiting display of the image in the upper region of the reference height or higher enables a delay for the driver in noticing an obstruction to be suppressed from occurring.

A vehicle display control device of a fifth aspect is the vehicle display control device of any one of the first aspect to the third aspect, wherein the image extends from a lower portion of the display area toward the detection object as seen by the vehicle driver, and the display control section controls cause display of the image from the lower portion of the display area as far as a location corresponding to the detection object in a case in which a distance between the vehicle and the detection object is not greater than a reference distance set according to the reference height, and controls cause display of the image from the lower portion of the display area as far as a location corresponding to the reference height in a case in which the distance between the vehicle and the detection object exceeds the reference distance set according to the reference height. Due to the mode of display of the image being modified in this manner according to the reference distance set based on the reference height, the processing load can be reduced for when displaying the image.

The vehicle display control device of the fifth aspect is the vehicle display control device of any one of the first aspect to the fourth aspect, wherein the image is configured including plural arrow shapes arranged along a straight line connecting a lower center of the display area to the detection object as seen by a vehicle driver. This thereby enables the driver to quickly be aware of an obstruction ahead of the vehicle.

A vehicle of a sixth aspect includes the vehicle display control device of any one of the first aspect to the fifth aspect and a head-up display that displays the image according to a control signal output from the vehicle display control device. This thereby enables the image to be displayed on the display area in front of the driver's seat of the vehicle while suppressing this from becoming a distraction to the driving of the vehicle driver.

A vehicle display control method of a seventh aspect is a vehicle display control method of processing executed by a computer. The processing includes acquiring position information of a detection object ahead of a vehicle, generating an image indicating a direction from the vehicle toward the detection object based on the acquired position information of the detection object, and, when the generated image is displayed on a display area in front of a driver's seat of the vehicle, causing displaying of the image overlaid on a forward scene of the vehicle while limiting display of the image in a specific region inside the display area. Thus similarly to the first aspect, this enables the image to be displayed on the display area in front of the driver's seat of the vehicle while suppressing this from becoming a distraction to the driving of the vehicle driver.

A recording medium recorded with a vehicle display control program of an eighth aspect is a recording medium recorded with a vehicle display control program that causes a computer to execute processing. The processing includes acquiring position information of a detection object ahead of a vehicle, generating an image indicating a direction from the vehicle toward the detection object based on the acquired position information of the detection object, and, when the generated image is displayed on a display area in front of a driver's seat of the vehicle, causing display of the image overlaid on a forward scene of the vehicle while limiting display of the image in a specific region inside the display area. Thus similarly to the first aspect, this enables the image to be displayed on the display area in front of the driver's seat of the vehicle while suppressing this from becoming a distraction to the driving of the vehicle driver.

The present disclosure as described above exhibits the advantageous effect of enabling an image to be displayed in a display area in front of a driver's seat of a vehicle while suppressing this from becoming a distraction to the driving of the vehicle driver.

DETAILED DESCRIPTION

Exemplary Embodiment

Explanation follows regarding a vehicle display control device of an exemplary embodiment, with reference to the drawings.

Figure 1:
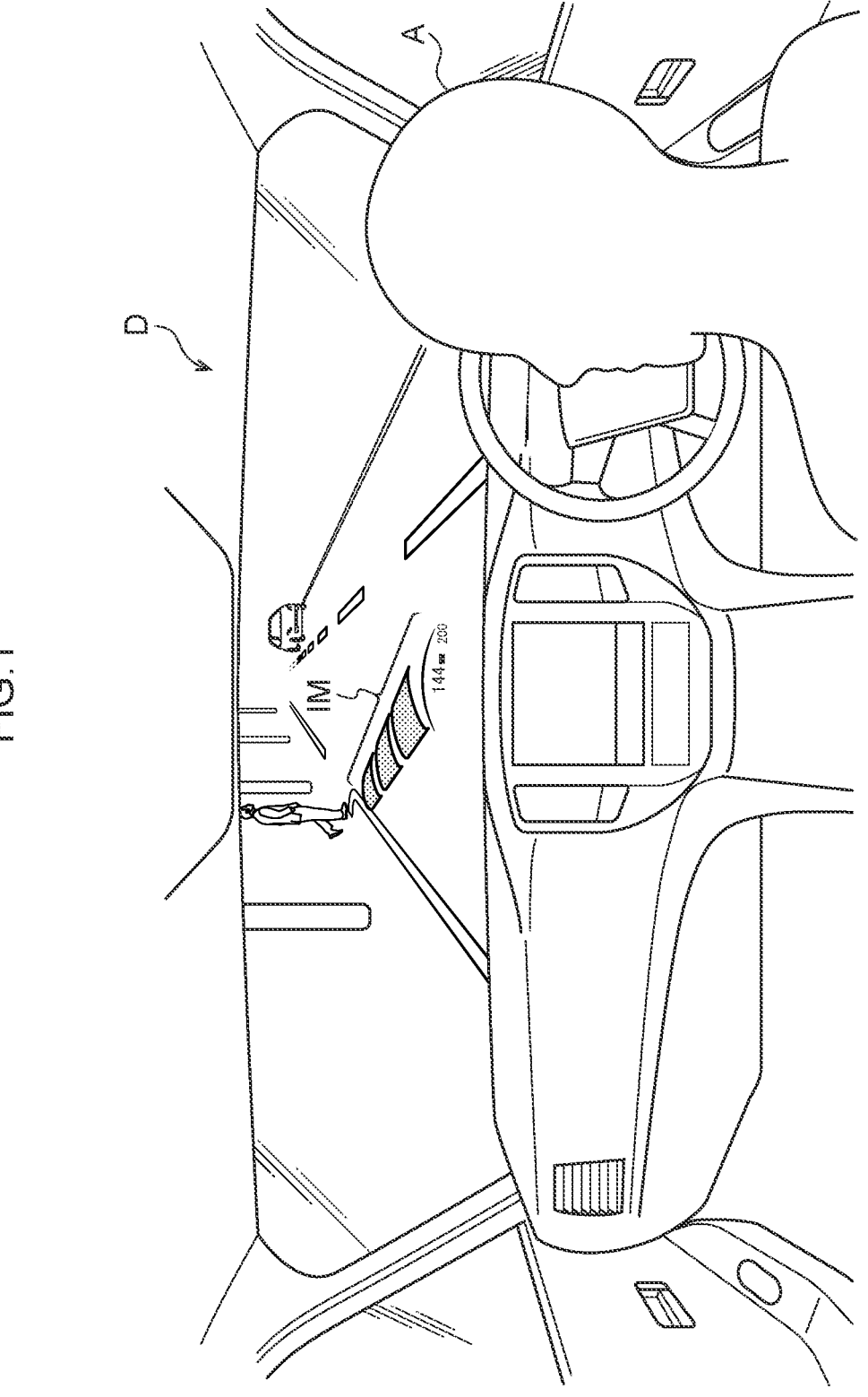
FIG. 1 is an explanatory diagram to explain an outline of the present exemplary embodiment.

FIG. 1 is a diagram to explain the present exemplary embodiment. As illustrated in FIG. 1, a vehicle display control device of the present exemplary embodiment displays, for example, an image IM to attract attention to the presence of a person ahead of a vehicle on a display area D in front of a driver's seat of a vehicle. Note that, as illustrated in FIG. 1, the vehicle display control device displays the image IM overlaid on a forward scene of a vehicle when the image is displayed in the display area D.

Figure 2:
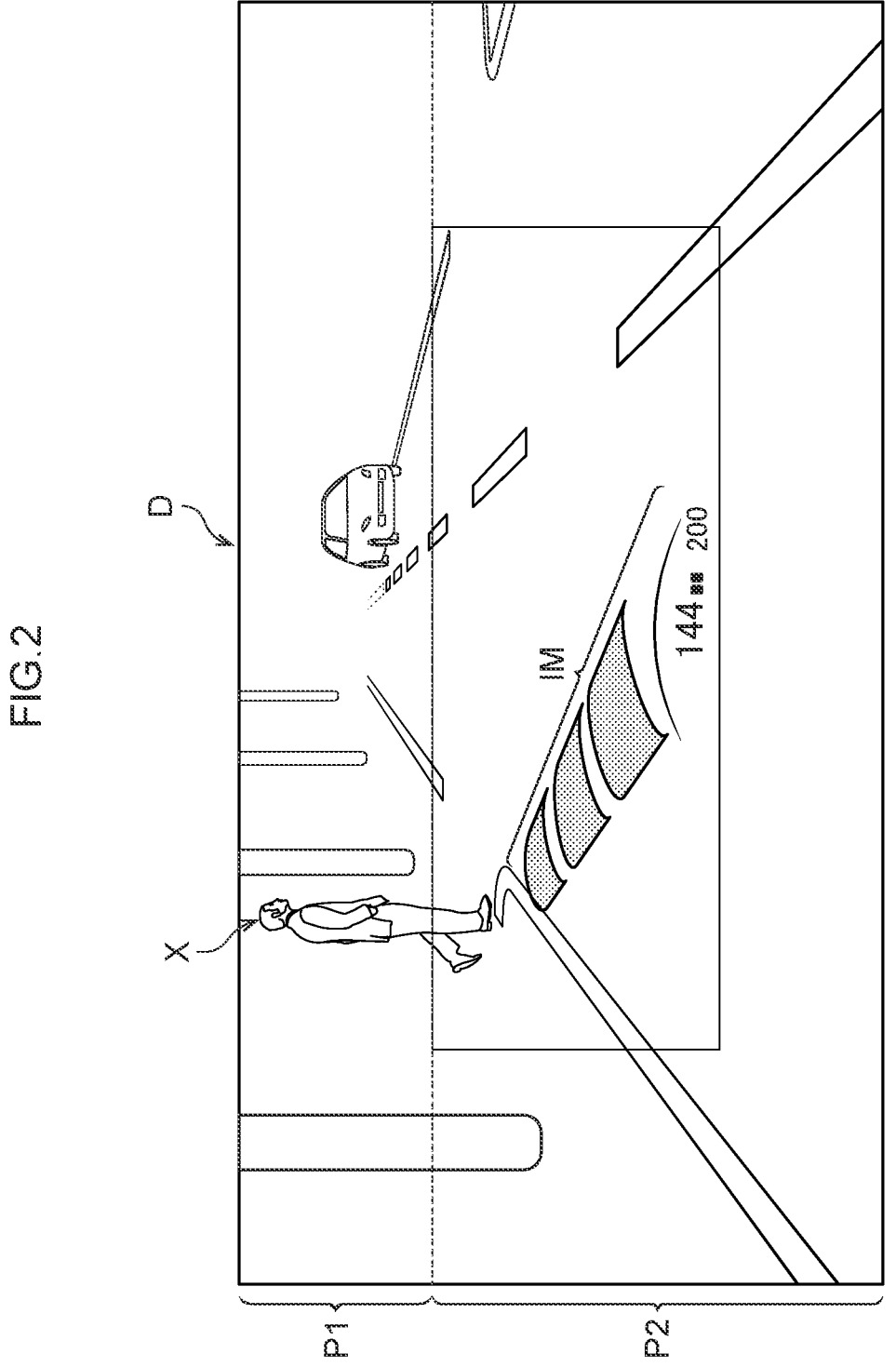
FIG. 2 is a diagram to explain details about when displaying an image on a display area ahead of a vehicle.

FIG. 2 is a diagram to explain details about when displaying the image IM on the display area D ahead of the vehicle. As illustrated in FIG. 2, in cases in which a person X, serving as an example of a detection object ahead of a vehicle, is present ahead of the vehicle, the image IM is displayed on the display area D ahead of the vehicle. In such cases, were the image IM to be overlay displayed on a region P1 of a reference height or higher inside the display area D then sometimes this might actually distract the driving of the driver. This is because a driver often gazes into the distance when driving a vehicle, and so were the image IM to be displayed on the region P1 of a specific reference height or higher as seen by the driver, then the image IM would always be inside the field of vision of the driver.

However, as illustrated in FIG. 2, in the vehicle display control device of the present exemplary embodiment, display of the image IM in the region P1 of a specific reference height or higher as seen by the driver is limited. As illustrated in FIG. 2, the vehicle display control device displays the image IM overlaid on a forward scene of a vehicle in a region P2 in the display area D, which is different from the region P1 of a reference height or higher. This thereby enables vehicle surrounding information to be notified to the driver while suppressing this from becoming a distraction to the driving of the vehicle driver. Specific explanation follows.

Figure 3:
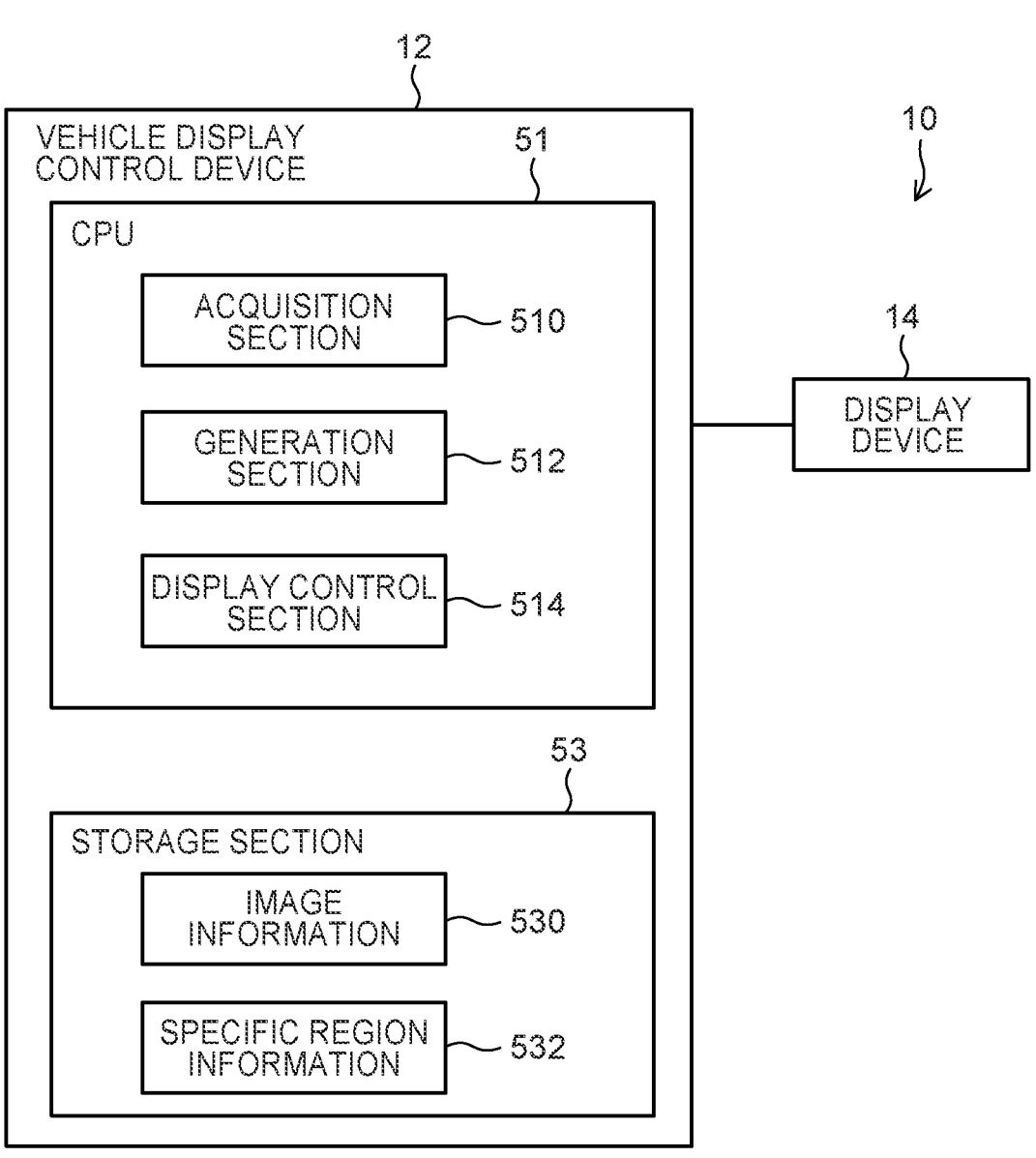
FIG. 3 is a schematic block diagram of a vehicle display control system according to the present exemplary embodiment.

FIG. 3 is a block diagram illustrating an example of a configuration of a vehicle display control system 10 according to an exemplary embodiment. As illustrated in FIG. 3, the vehicle display control system 10 includes a vehicle display control device 12 and a display device 14. The vehicle display control system 10 is installed in a vehicle.

Vehicle Display Control Device

As illustrated in FIG. 3, the vehicle display control device 12 includes a central processing unit (CPU) 51 and a storage section 53.

Figure 4:
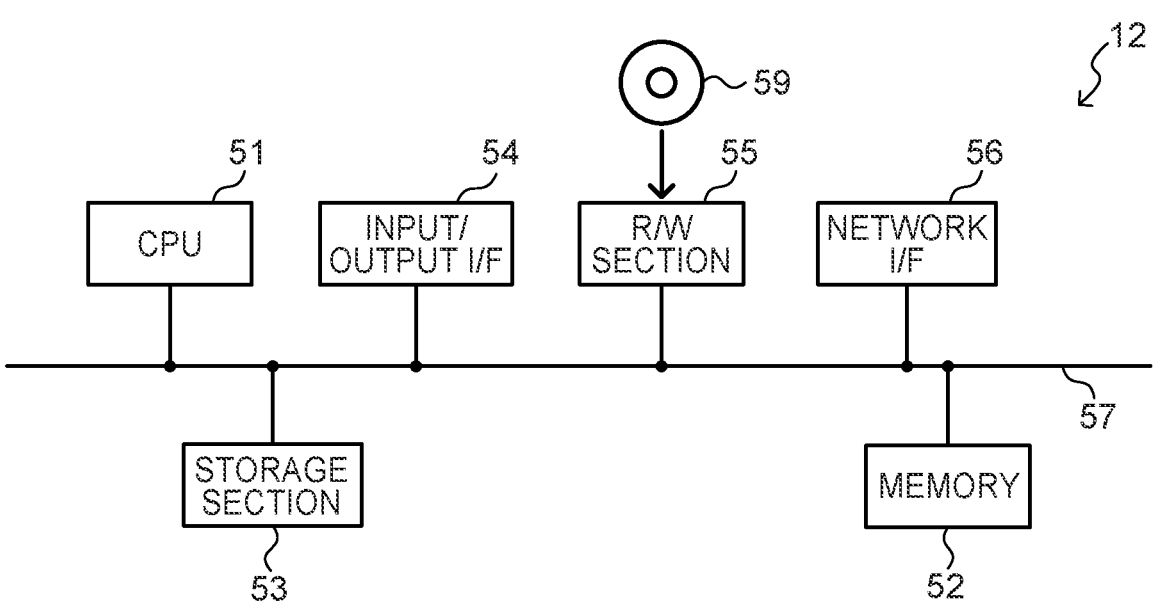
FIG. 4 is a diagram illustrating an example of a configuration of a computer of a vehicle display control device.

More specifically, the vehicle display control device 12 may be implemented by a computer such as illustrated in FIG. 4. The computer implementing the vehicle display control device 12 includes the CPU 51, memory 52 serving as a temporary storage area, and the non-transient storage section 53. The computer also includes an input/output interface (I/F) 54 connected to an input/output device or the like (omitted in the drawings), and a read/write (R/W) section 55 to control reading data from a recording medium 59, and writing data thereto. The computer also includes a network I/F 56 connected to a network such as the Internet. The CPU 51, the memory 52, the storage section 53, the input/output I/F 54, the R/W section 55, and the network I/F 56 are connected together through a bus 57.

The storage section 53 may be implemented by a hard disk drive (HDD), solid state drive (SSD), or flash memory. A program to cause the computer to function is stored on the storage section 53 serving as a storage medium. The CPU 51 reads the program from the storage section 53, expands the program into the memory 52, and sequentially executes the processes of the program.

As illustrated in FIG. 3, the CPU 51 of the vehicle display control device 12 includes, from a functional perspective, an acquisition section 510, a generation section 512, and a display control section 514. The processing of the acquisition section 510, the generation section 512, and the display control section 514 will be described later.

As illustrated in FIG. 3, image information 530 and specific region information 532 is also stored in the storage section 53 of the vehicle display control device 12. The image information 530 is information employed to generate the image IM. The specific region information 532 is information related to a specific region P1, and is pre-set with whether or not a location inside the display area D is in the specific region P1.

Display Device

The display device 14 displays various information in the display area D ahead of the vehicle according to a control signal output from the vehicle display control device 12. The display device 14 is, for example, a head-up display (HUD) installed to the vehicle.

Next, description follows regarding operation of the vehicle display control system of the exemplary embodiment.

Figure 5:
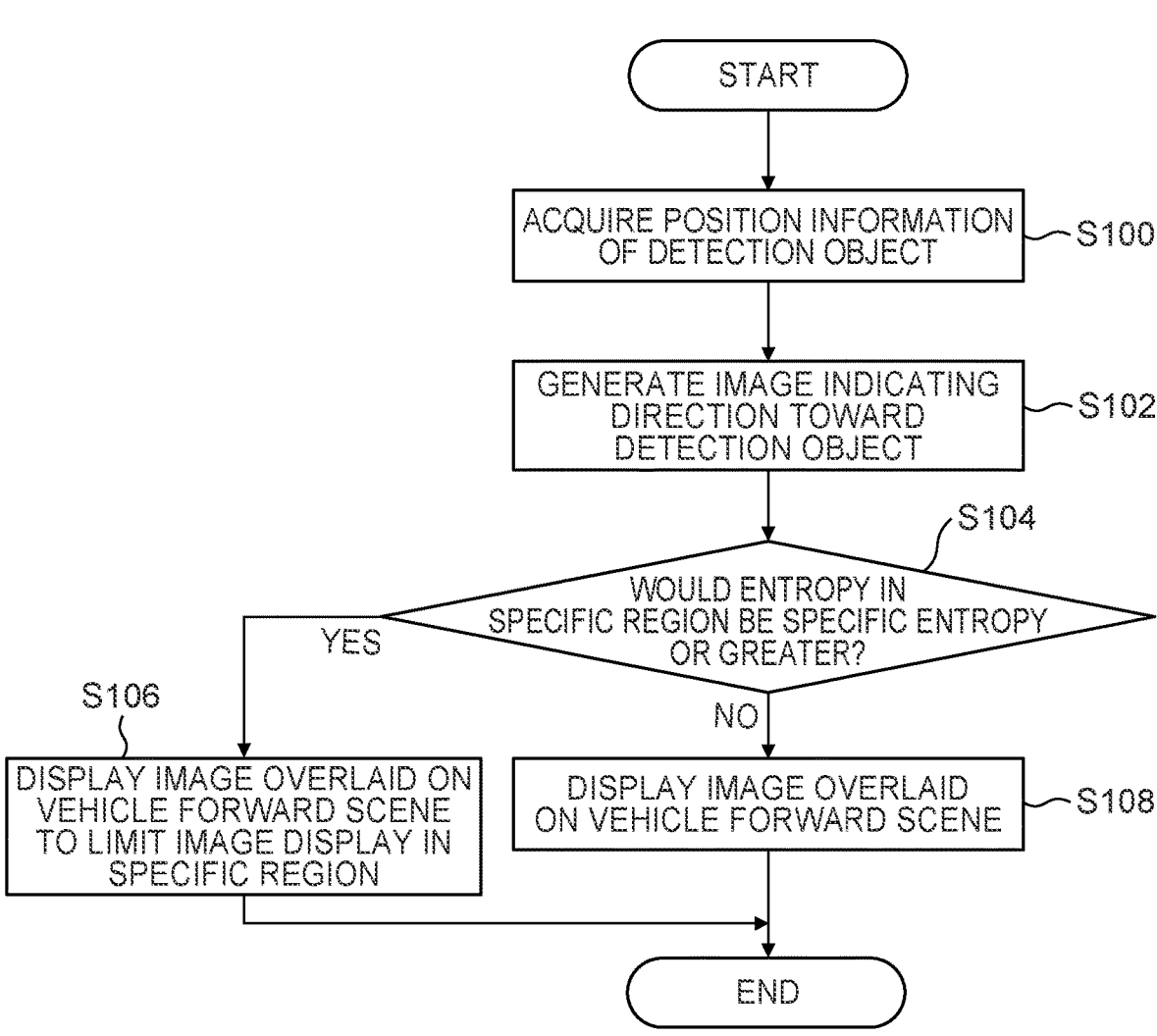
FIG. 5 is a flowchart illustrating an example of processing performed by a vehicle display control device according to an exemplary embodiment.

The vehicle display control device 12 executes a vehicle display control processing routine illustrated in FIG. 5 when in receipt of a control signal indicating that a detection object has been detected ahead of the vehicle.

At step S100, the acquisition section 510 of the CPU 51 of the vehicle display control device 12 acquires position information representing a position of a detection object X in the display area. D in front of the driver's seat of the vehicle. For example, the acquisition section 510 uses a known image processing algorithm to acquire position information of the detection object X in the display area D. Note that the detection object is, for example, a person or the like present ahead of the vehicle.

At step S102, the generation section 512 of the CPU 51 of the vehicle display control device 12 generates the image IM indicating a direction from the vehicle toward the detection object X based on the position information of the detection object X acquired at step S100. More specifically, the generation section 512 reads the image information 530 stored in the storage section 53, and, based on the image information 530 read thereby, generates the image IM indicating the direction from the vehicle toward the detection Object X.

As illustrated in FIG. 1 and FIG. 2, the image IM is configured including plural arrow shapes arranged along a straight line connecting a lower center of the display area D to the detection object X as seen by the vehicle driver A. The image IM configures an arrow extending from a lower portion of the display area D toward the detection object X as seen by the vehicle driver A. Arranging the plural arrow shapes in this manner along the straight line connecting the lower center of the display area D to the detection object X enables an image to be displayed on the display area in front of the driver's seat of the vehicle without the image IM being displayed in the region P1 where there is a possibility that this might distract driving of the driver A. This thereby enables the driver A to quickly be aware of the detection object X, which is an obstruction ahead of the vehicle.

At step S104, the display control section 514 of the CPU 51 of the vehicle display control device 12 determines whether or not the entropy of the information displayed inside the specific region P1 would be a specific entropy or greater in cases in which the image IM generated at step S102 was displayed as is in the display area D. Note that the entropy is, for example, a number of pixels, a surface area, or the like of the image IM being displayed inside the specific region P1. As illustrated in FIG. 2, the specific region of the present exemplary embodiment is the region P1 of the reference height or higher inside the display area D as seen by the vehicle driver.

Note that, for example, even though an image is displayed in the specific region P1, sometimes this does not become a distraction to the driving of the driver as long as the surface area of such an image is not greater than a specific surface area.

The display control section 514 of the CPU 51 of the vehicle display control device 12 accordingly reads the specific region information 532 from the storage section 53, then based on the specific region information 532, the display control section 514 determines whether or not this image IM would be displayed inside the specific region P1 and whether or not the entropy of the information displayed inside the specific region P1 would be the specific entropy or greater in cases in which the image IM generated at step S102 was displayed as is in the display area D. Processing proceeds to step S106 in cases in which the entropy of the information displayed inside the specific region P1 would be the specific entropy or greater. However, processing proceeds to step S108 in cases in which the entropy of the information displayed inside the specific region P1 would be less than the specific entropy.

At step S106, the display control section 514 of the CPU 51 of the vehicle display control device 12, when displaying the image IM generated at step S102 in the display area D in front of the driver's seat of the vehicle, controls the display device 14 so as to display the image IM overlaid on the forward scene of the vehicle while limiting display of the image IM in the specific region P1 inside the display area D.

More specifically, in cases in which the entropy of information displayed inside the specific region P1 would be the specific entropy or greater, the display control section 514 of the CPU 51 of the vehicle display control device 12 limits the display of the image IM in the specific region P1 such that the entropy of information displayed inside the specific region P1 becomes less than the specific entropy.

Figure 6:
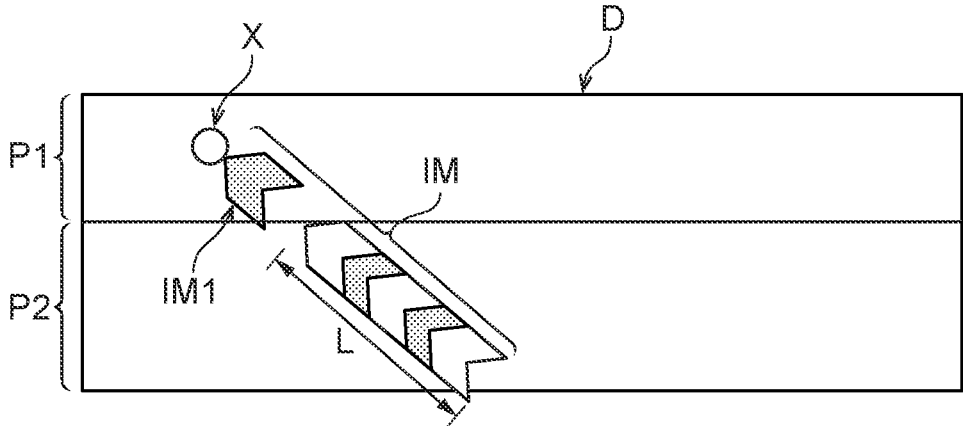
FIG. 6 is a diagram to explain processing to limit an entropy of information displayed in a specific region so as to become less than a specific entropy.

FIG. 6 is a diagram to explain processing to limit the entropy of information displayed inside the specific region P1 so as to become less than the specific entropy. As illustrated in FIG. 6, a portion IM1 of the image IM would be displayed inside the specific region P1 if the image IM were to be displayed as is inside the display area D.

To address this, in cases in which the portion IM1 of the image IM would be displayed in the specific region P1 were the image IM to be displayed as is on the display area D, the display control section 514 of the CPU 51 of the vehicle display control device 12 controls such that the IM1, which is a portion of the image IM, is not displayed inside the specific region P1 as illustrated in FIG. 6. Moreover, the display control section 514 of the CPU 51 of the vehicle display control device 12 also controls so as to display only part of the image IM1 inside the specific region P1.

More specifically, the display control section 514 of the CPU 51 of the vehicle display control device 12 controls such that in cases in which a distance between the vehicle and the detection object X exceeds a reference distance L set according to the reference height, as illustrated in FIG. 6, the image IM except tier the IM1 is displayed from the lower portion of the display area D to a location corresponding to the detection object X. This results in there no longer being an image for display inside the specific region P1, the entropy of information displayed inside the specific region P1 becomes less than the specific entropy, and the display of the image IM is suppressed from becoming a distraction to the driving of the driver. Note that the display control section 514 may be configured so as to reduce the surface area or number of pixels of the image displayed inside the specific region P1 such that the entropy of information displayed inside the specific region P1 becomes less than the specific entropy.

At step S108, the display control section 514 of the CPU 51 of the vehicle display control device 12 controls the display device 14 so as to display the image IM generated at step S102 overlaid on the forward scene of the vehicle. More specifically, in cases in which the distance between the vehicle and the detection object X is not greater than the reference distance L set according to the reference height, the display control section 514 of the CPU 51 of the vehicle display control device 12 controls so as to display the image IM as is from the lower portion of the display area D up to locations corresponding to the reference height.

This thereby limits display of an image in the specific region P1, enabling an image to be displayed on a display area in front of the driver's seat of the vehicle while suppressing this from becoming a distraction to the driving of a vehicle driver.

As described above, the vehicle display control device 12 of the vehicle display control system 10 according to the present exemplary embodiment acquires position information of the detection object ahead of a vehicle. The vehicle display control device 12 generates an image indicating a direction from the vehicle toward the detection object based on the position information of the detection object. When displaying an image in the display area in front of a driver's seat of the vehicle, the vehicle display control device 12 limits display of the image in the specific region inside the display area, and displays the image overlaid on the forward scene of the vehicle. This thereby enables the image to be displayed on the display area in front of the driver's seat of the vehicle while suppressing this from becoming a distraction to the driving of the vehicle driver.

Moreover, the vehicle display control device 12 according to the present exemplary embodiment enables vehicle surroundings information to be notified to the driver while suppressing this from becoming a distraction to the driving of the vehicle driver. The vehicle display control device 12 also enables a delay for the driver in noticing an obstruction ahead of the vehicle to be suppressed from occurring due to limiting display of an image in the specific region. The vehicle display control device 12 also enables display of an image to be suppressed from becoming a distraction to the driving of the driver due to limiting the display of an image in the specific region where driving of the driver might be easily distracted.

This concludes a description of the vehicle display control system 10 according to the present exemplary embodiment, however obviously various embodiments may be implemented within a scope not departing from the spirit of the present disclosure.

For example, although an example was described in the above exemplary embodiment of a case in which the specific region P1 is a region of the reference height or higher inside the display area D as seen by the vehicle driver, there is no limitation thereto. The specific region P1 is able to be set in advance by the specific region information 532, and so another region may be set as the specific region P1 as long is this is a region liable to become a distraction to driving by a driver. For example, a region on a driver's seat side inside the display area D is a region that readily falls within the gaze of a driver, and so a region on the driver's seat side inside the display area D (for example, a region that is on the driver's seat side inside the display area D and is also a region at the reference height or higher inside the display area D as seen by the vehicle driver) may be set so as to be the specific region.

Moreover, the processing executed in the above exemplary embodiment by the CPU reading and executing software (a program) may be executed by various processors other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The processing may be executed by any one of these various types of processors, or may be executed by a combination of two or more of the same type or different types of processors (such as plural FPGAs, or a combination of a CPU and an FPGA). The hardware structure of these various types of processors is more specifically an electric circuit combining circuit elements such as semiconductor elements.

Furthermore, although the above exemplary embodiment was configured such that various data was stored in storage, there is no limitation thereto. For example, a recording medium such as a compact disk (CD), a digital versatile disk (DVD), or a universal serial bus (USB) memory may be employed as the storage section. In such cases various programs, data, and the like is stored on such a recording medium.

All publications, patent applications, and technical standards mentioned in this specification are herein incorporated by reference to the same extent as if each individual publication, patent application, or technical standard was specifically and individually indicated to be incorporated by reference.

What is claimed is:

1. A vehicle display control device comprising a memory and a processor connected to the memory, wherein the processor is configured to:

acquire position information of a detection object ahead of a vehicle;

generate an image indicating a direction from the vehicle toward the detection object based on the acquired position information of the detection object;

when the generated image is displayed on a display area in front of a driver's seat of the vehicle, cause display of the image to be overlaid on a forward scene of the vehicle while limiting display of the image by not displaying the image in a specific region inside the display area, the image extends from a lower portion of the display area toward the detection object as seen by the vehicle driver;

cause display of the image from the lower portion of the display area as far as a location corresponding to the detection object in a case in which a distance between the vehicle and the detection object is not greater than a reference distance set according to a reference height; and cause display of the image from the lower portion of the display area as far as a location corresponding to the reference height in a case in which the distance between the vehicle and the detection object exceeds the reference distance set according to the reference height.

2. The vehicle display control device of claim 1, wherein, in a case in which an entropy of information displayed in the specific region would be a specific entropy or greater, the processor is configured to limit display of the image in the specific region such that the entropy of information displayed in the specific region becomes less than the specific entropy.

3. The vehicle display control device of claim 1, wherein the specific region is a region of a reference height or higher inside the display area as seen by a vehicle driver.

4. The vehicle display control device of claim 1, wherein the image is configured including a plurality of arrow shapes arranged along a straight line connecting a lower center of the display area to the detection object as seen by a vehicle driver.

5. A vehicle comprising:

the vehicle display control device of claim 1; and a head-up display that displays the image according to a control signal output from the vehicle display control device.

6. A vehicle display control method comprising, by a processor:

acquiring position information of a detection object ahead of a vehicle;

generating an image indicating a direction from the vehicle toward the detection object based on the acquired position information of the detection object;

when the generated image is displayed on a display area in front of a driver's seat of the vehicle, causing display of the image to be overlaid on a forward scene of the vehicle while limiting display of the image by not displaying the image in a specific region inside the display area, the image extends from a lower portion of the display area toward the detection object as seen by the vehicle driver;

causing display of the image from the lower portion of the display area as far as a location corresponding to the detection object in a case in which a distance between the vehicle and the detection object is not greater than a reference distance set according to a reference height; and causing display of the image from the lower portion of the display area as far as a location corresponding to the reference height in a case in which the distance between the vehicle and the detection object exceeds the reference distance set according to the reference height.

7. A non-transitory recording medium storing a vehicle display control program that is executable by a processor to perform processing comprising:

acquiring position information of a detection object ahead of a vehicle;

generating an image indicating a direction from the vehicle toward the detection object based on the acquired position information of the detection object;

when the generated image is displayed on a display area in front of a driver's seat of the vehicle, causing display of the image to be overlaid on a forward scene of the vehicle while limiting display of the image by not displaying the image in a specific region inside the display area, the image extends from a lower portion of the display area toward the detection object as seen by the vehicle driver;

causing display of the image from the lower portion of the display area as far as a location corresponding to the detection object in a case in which a distance between the vehicle and the detection object is not greater than a reference distance set according to a reference height; and causing display of the image from the lower portion of the display area as far as a location corresponding to the reference height in a case in which the distance between the vehicle and the detection object exceeds the reference distance set according to the reference height.

8. The vehicle display control device of claim 1, wherein the display area includes at least a first region and a second region, the first region is the specified region, and when the image straddles a boundary between the first region and the second region, a portion of the image to be displayed in the first region is not displayed.

9. The vehicle display control device of claim 1, wherein the processor is configured to reduce a surface area or number of pixels of the image displayed inside the specific region when limiting the display.

\* \* \* \* \*